J. W. IVORY.
RUBBER DAM CLAMP.
APPLICATION FILED JULY 22, 1910.
980,530.
Patented Jan. 3, 1911.
Fig. 1.
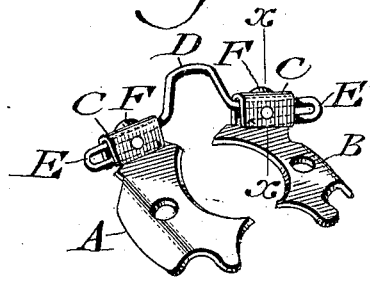
Fig. 3.
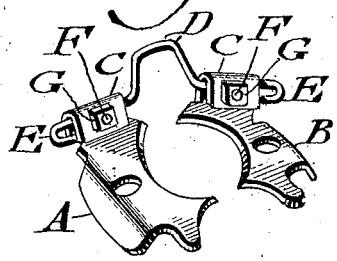
Fig. 2.
Fig. 4.
Fig. 5.
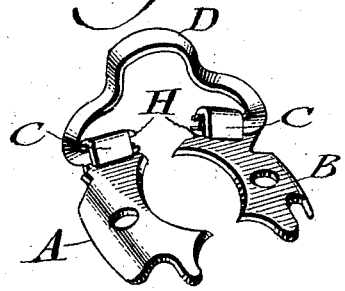
Fig. 6.
Fig. 8.
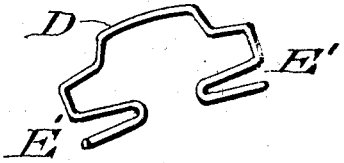
Fig. 7.
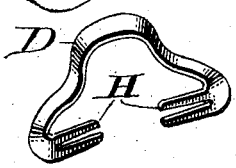
WITNESSES
P. F. Nagle.
L. Onville
INVENTOR
James W. Ivory.
BY
ATTORNEYS

UNITED STATES PATENT OFFICE.

JAMES W. IVORY, OF PHILADELPHIA, PENNSYLVANIA.

RUBBER-DAM CLAMP.

980,530.

Specification of Letters Patent.

Patented Jan. 3, 1911.

Application filed July 22, 1910. Serial No. 573,165.

*To all whom it may concern:*

Be it known that I, JAMES W. IVORY, a subject of the King of Great Britain, residing in the city and county of Philadelphia, State of Pennsylvania, have invented a new and useful Rubber-Dam Clamp, of which the following is a specification.

My invention consists of a rubber dam clamp having jaws which are laterally adjustable or adjustable in width to and from each other, for purposes requiring the same relatively to the tooth to which the clamp is applied.

For the purpose of explaining my invention, the accompanying drawing illustrates a satisfactory reduction of the same to practice, but the important instrumentalities thereof may be varied, and so it is to be understood that the invention is not limited to the specific arrangement and organization shown and described.

Figure 1 represents a perspective view of a rubber dam clamp embodying my invention. Fig. 2 represents a section of a portion thereof on line x—x Fig. 1. Figs. 3, 4 and 5 represent perspective views of other embodiments of the clamp. Fig. 6 represents a perspective view of the bow or yoke shown in Figs. 1 and 3, the jaws having been removed therefrom. Figs. 7 and 8 represent perspective views of different form of bows or yokes comprising carriers to which the jaws of the clamps are affixed, and on which they are adjustable.

Similar letters of reference indicate corresponding parts in the figures.

Referring to the drawings:—A and B represent the jaws of a rubber dam clamp, each of the same having one end turned-up from the face of the jaw, forming a sleeve C, the inner terminal of which is separated from the portion of the jaw opposite thereto.

D designates a yoke or bow employed for connecting and carrying the jaws and adjusting them to and from each other, so as to be adapted to be fitted on teeth of different sizes and contours, said yoke having its ends or terminal portions inturned in lateral direction, forming the loops E, which are inserted in the sleeves C, so that the jaws are movable to and from each other on said loops, each sleeve being provided with a screw F which is passed through the sides of the sleeve and consequently between the members of the loops E, so that said sleeves clamp said loops whereby the jaws may be tightly connected with the yoke and retain the positions to which they may be set or adjusted.

In Fig. 3, there is shown the same construction as in Figs. 1 and 2, excepting that the screws F, are provided with nuts G, for increasing the tightening action of the sleeves C on the yoke D.

In Figs. 4 and 8, the members of the loops E are turned in lateral direction in reversed position to those shown in Figs. 1, 2 and 6.

In Figs. 5 and 7, I show a yoke having its ends inturned in lateral direction and bifurcated as at H, the bifurcations being adapted to enter the sleeves C and engage the same, thus connecting and carrying the jaws, but as is evident screws are applicable to said sleeves of Figs. 5 and 7 to compress of close the same adjacent the contiguous parts of the jaws.

In said Figs. 1, 2, 3 and 4, the yoke is of the form of a bow of sufficiently strong wire or round metal, while in Figs. 5 and 7, the bow is formed of sheet metal, without materially producing different results.

It is evident that the jaws are telescoped on the terminals of the yoke, and so are slidingly mounted on the yokes, whereby they may be moved to and from each other and so adjusted relatively to each other according to requirements.

The loops and bifurcations are somewhat resilient and so adapted to take firm hold on the sleeves C, and this is increased by the action of the screws as in Figs. 1 and 2, and the screws and nuts as in Fig. 3.

Having thus described my invention what I claim as new and desire to secure by Letters Patent, is:—

1. A rubber dam clamp provided with independent jaws, and a bow having laterally-extending terminal portions adapted to support and laterally adjust said jaws which are freely seated and adapted to be tightened in adjusted position thereon.

2. A rubber dam clamp composed of independently movable jaws, sleeves on the same, and a carrying bow having its terminal portions adapted to engage said sleeves and admit of the lateral adjustment of the same.

3. In a rubber dam clamp, a jaw, a sleeve continuous of an end thereof, and a bow having a laterally extending portion, said sleeve freely receiving said portion of the bow, and clamping the same, and adapted to hold the jaw in laterally adjusted position thereon.

4. A rubber dam clamp composed of jaws with divided sleeves and a bow, said jaws and bow being separate and said sleeves freely receiving the adjacent end portion of said bow, and adapting the jaws to be laterally adjustable on said bow, and screws fitted to the opposite sides of said sleeve for securing the said jaws in set position on said bow.

JAMES W. IVORY.

Witnesses:
 JOHN A. WIEDERSHEIM,
 WM. CANER WIEDERSEIM.